UNITED STATES PATENT OFFICE.

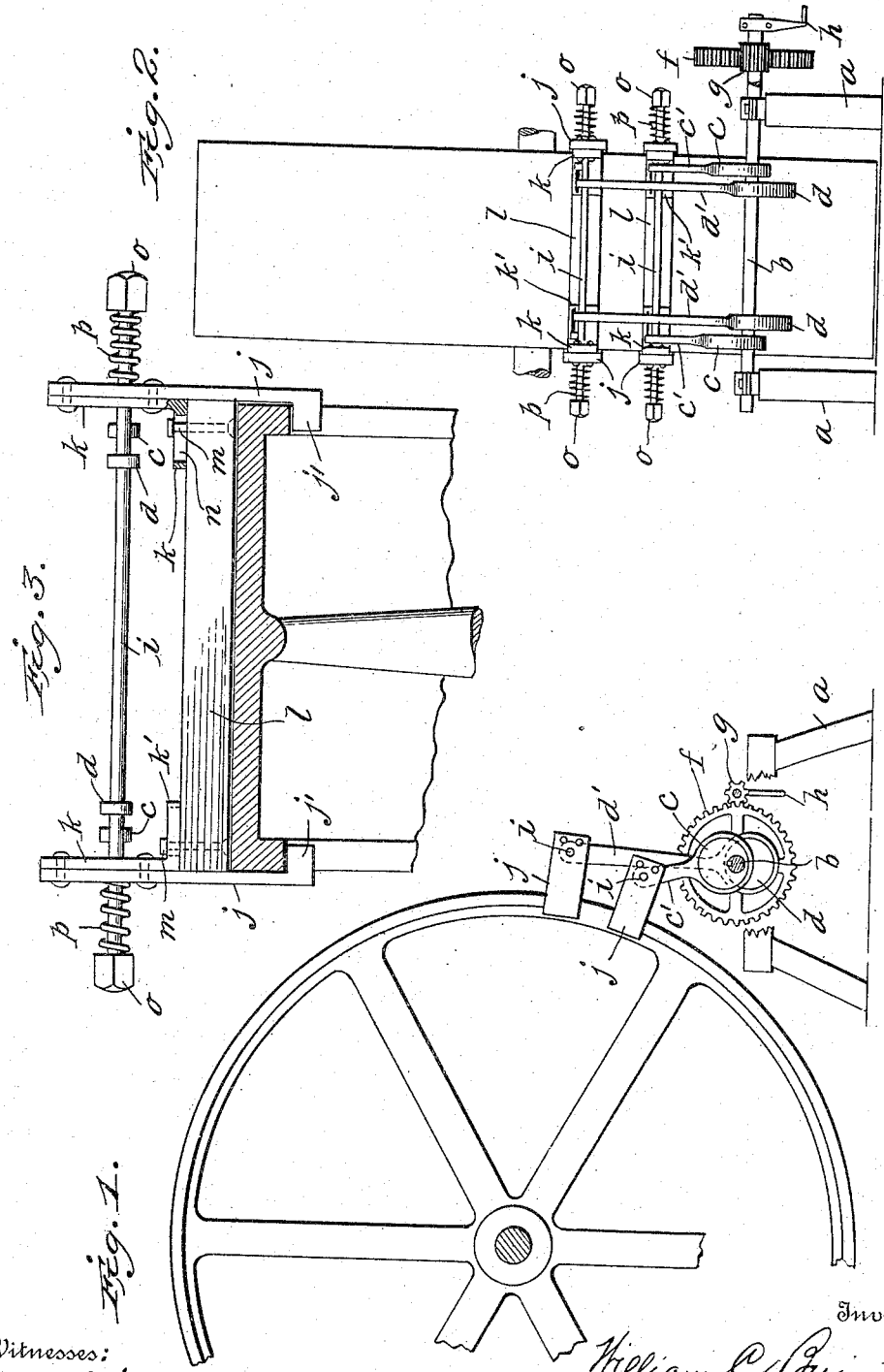

WILLIAM C. BYINGTON, OF BOGALUSA, LOUISIANA.

JACK FOR STARTING ENGINES.

947,294.  Specification of Letters Patent.  Patented Jan. 25, 1910.

Application filed November 11, 1909. Serial No. 527,532.

*To all whom it may concern:*

Be it known that I, WILLIAM C. BYINGTON, a citizen of the United States, and a resident of Bogalusa, in the parish of Washington, State of Louisiana, have invented certain new and useful Improvements in Jacks for Starting Engines, of which the following is a full clear specification, reference being had to the accompanying drawings, in which—

Figure 1 is a side elevation of my improved apparatus showing the manner of applying it to a fly wheel; Fig. 2 is a rear elevation of the same; and Fig. 3 a plan view of one of the grips or clutches, the rim of the fly wheel being shown in transverse section.

The object of this invention is to provide a simple manually-operable apparatus for jacking fly wheels off center, it being especially adapted for the larger sizes of engines, as more fully hereinafter set forth.

Referring to the drawings by reference-characters, $a$ designates a suitable frame placed or erected on the floor adjacent to the fly wheel, and mounted on this frame is a shaft $b$, which is parallel with the peripheral face of the fly wheel and extends transversely thereof. Affixed to this shaft are two pairs of eccentrics $c$ and $d$, set 180° apart. The pair $c$ each carries an upstanding pitman $c'$ and the pair $d$ each carries an upstanding pitman $d'$, the pitman $d'$ being longer than the other pair. Each pair of pitmen carries at its upper end a gripping or clutching device adapted to engage the rim of a fly wheel when, by the rotation of shaft $b$, the pitmen are elevated and to release and slide downwardly on the rim when the pitmen descend, so that the clutches work intermittently and alternately to grip and rotate the fly wheel. To rotate shaft $b$ I may employ any suitable means but I prefer to employ a large cog wheel $f$ mounted on the shaft and adapted to mesh with a pinion $g$ mounted on an adjacent short shaft which is provided with a hand crank $h$. As is obvious, a continuous rotation of the shaft $b$ causes the gripping devices to alternately reciprocate up and down and to alternately grip the fly wheel and rotate it on its axle and thus throw the wrist-pin and pitman of the engine off the center and consequently permit the engine to be readily started.

The gripping devices each consists of a rod $i$ mounted in the upper ends of each pair of pitmen and extending across the face of the fly wheel and beyond the pitmen and the side edges of the rim of the fly wheel. Slidingly mounted on the end of each rod, outside of the pitman is a plate $j$ which extends forwardly across the side edge of the fly wheel rim and is provided with a lug $j'$ which extends laterally behind the rim. Riveted to the inner face of each plate $j$ is a shorter plate $k$ which at a point between the rod $i$ and the face of the fly wheel is provided with an inwardly extending lug $k'$ which lies parallel with the face of the fly wheel and the inner or gripping face of the lug $j'$. Each opposite pair of lugs or arms $k'$ is connected by a wooden beam or bar $l$ which extends entirely across the face of the fly wheel and lies normally against said face. This bar or beam is attached to the lugs $k$ by bolts or pins $m$ whose headed ends extend through slots $n$ in said lugs, said pin and slot connection being a sufficiently loose one to enable the plates $j$ with their angle plates $k$ $k'$ to have a limited sliding movement outwardly on the supporting rod $i$. On each end of each rod $i$ is a nut or head $o$ and between each head or nut and the adjacent face of plate $j$ is a coil-spring $p$, said two springs $p$ on each rod serving to normally press the companion plates $j$ inwardly and hold their inner gripping lugs $j'$ behind the fly wheel rim.

With gripping devices constructed as above described, it will be observed that with each upward movement of the gripping device the fly wheel rim will be gripped behind by the two lugs $j'$ and entirely across its face by the wooden beam or bar $l$. In this way a very effectual and firm clutching of the wheel rim is obtained and thus not only insuring a powerful gripping action but also insuring the application of the force to the wheel in such manner that the liability to injuring the gripping device or the fly wheel is reduced to minimum. With a gripping device of this character I have found that with a comparatively small apparatus I may quickly jack off center the heaviest types of fly wheel.

It will be observed that to detach the gripping devices from the fly wheel rim it is simply necessary to slide the plates $j$ outwardly against the action of springs $p$ far enough to disengage the lugs $j'$ from the rim, whereupon the pitmen carrying the gripping devices may be swung backwardly away from the rim and allowed to rest upon the frame or upon a suitable rest attached thereto.

Having thus fully described my invention, what I claim as new, and desire to secure by Letters Patent, is—

1. In an apparatus of the class set forth, the combination of a frame, a rotary shaft thereon and means for rotating it, two pairs of oppositely disposed eccentrics, a pair of upstanding pitmen attached to each pair of eccentrics, one pair being shorter than the other, and an intermittent fly wheel gripping device carried by each pair.

2. In an apparatus of the class set forth, two pairs of pitmen one pair being shorter than the other and means for alternately reciprocating them upwardly and downwardly, and a gripping device carried by each pair of pitmen and consisting of a pair of plates mounted pivotally thereon and extending across the opposite side edge of the rim of the fly wheel and provided with lugs adapted to grip the inner face of the rim of the fly wheel, and a transverse bar or beam carried by said plate and extending across the face of the fly wheel rim.

3. In an apparatus of the class set forth, a frame, upstanding pitmen and means for alternately reciprocating them upwardly and downwardly, and a pair of alternately operating fly-wheel-rim gripping devices carried by said pitmen and each consisting of a rod supported by the pitmen, a pair of plates pivotally and slidingly mounted on the rod and carrying means for gripping the inner face of the fly wheel rim and also means for gripping the outer face of the fly wheel rim, and means for normally pressing said plates inwardly toward the side edges of the rim of the fly wheel.

In testimony whereof I hereunto affix my signature in the presence of two witnesses this 2nd day of November 1909.

WILLIAM C. BYINGTON.

Witnesses:
J. E. PIERCE,
L. F. WEBB.